(12) United States Patent
Airaudo et al.

(10) Patent No.: US 11,821,334 B2
(45) Date of Patent: Nov. 21, 2023

(54) TURBINE BLADES INCLUDING AERO-BRAKE FEATURES AND METHODS FOR USING THE SAME

(71) Applicant: GE Avio S.r.l., Rivalta di Torino (IT)

(72) Inventors: Massimiliano Airaudo, Nichelino (IT); Paolo Calza, Arco (IT); Francesco Bertini, Piossasco (IT); Matteo Renato Usseglio, Turin (IT); Cristian Lizzer, Grugliasco (IT); Ernesto Sozio, Orbassano (IT); Matteo Furfaro, Savona (IT); Marco Thiene, Rubano (IT)

(73) Assignee: GE AVIO S.R.L., Rivalta di Torino (IT)

( * ) Notice: Subject to any disclaimer, the term of this patent is extended or adjusted under 35 U.S.C. 154(b) by 35 days.

(21) Appl. No.: 17/388,143

(22) Filed: Jul. 29, 2021

(65) Prior Publication Data

US 2022/0098987 A1 Mar. 31, 2022

(30) Foreign Application Priority Data

Jul. 30, 2020 (IT) .......................... 102020000018631

(51) Int. Cl.
*F01D 5/14* (2006.01)
*F01D 5/18* (2006.01)

(52) U.S. Cl.
CPC .............. *F01D 5/187* (2013.01); *F01D 5/143* (2013.01); *F05D 2240/307* (2013.01); *F05D 2250/185* (2013.01); *F05D 2260/2212* (2013.01); *F05D 2260/22141* (2013.01)

(58) Field of Classification Search
CPC ........ F01D 5/143; F01D 11/001; F01D 5/145; F01D 11/02; F01D 5/082; F01D 11/006; F05D 2240/80
See application file for complete search history.

(56) References Cited

U.S. PATENT DOCUMENTS

| 7,244,104 | B2 | 7/2007 | Girgis et al. |
| 7,465,152 | B2 | 12/2008 | Nigmatulin |
| 8,186,952 | B2 | 5/2012 | Tibbott |
| 8,647,064 | B2 | 2/2014 | Boyer |
| 8,721,291 | B2 | 5/2014 | Lee et al. |
| 9,039,357 | B2 * | 5/2015 | Lee ....................... F01D 11/001 416/193 A |
| 9,631,509 | B1 * | 4/2017 | Lee .......................... F16J 15/44 |

(Continued)

FOREIGN PATENT DOCUMENTS

| EP | 2206887 A2 | 7/2010 |
| GB | 2119027 A | 11/1983 |
| WO | 2014/099102 A1 | 6/2014 |

*Primary Examiner* — Eldon T Brockman
(74) *Attorney, Agent, or Firm* — Venable LLP; Peter T. Hrubiec; Michele V. Frank

(57) ABSTRACT

A turbine blade including an airfoil portion extending between a leading edge and a trailing edge, a base portion positioned below the airfoil portion, the base portion including an outwardly-extending wing positioned below the airfoil portion, and an aero-brake feature positioned between the outwardly-extending wing and the airfoil portion and extending outward from the base portion, where the aero-brake feature is structurally configured to disrupt axial airflow across the turbine blade.

20 Claims, 11 Drawing Sheets

(56) References Cited

U.S. PATENT DOCUMENTS

| | | |
|---|---|---|
| 10,030,523 B2 | 7/2018 | Quach et al. |
| 10,190,416 B2 | 1/2019 | Zscherp |
| 10,982,566 B2* | 4/2021 | Fujimura ................ F01D 5/145 |
| 2006/0120864 A1* | 6/2006 | Lu ........................ F01D 11/005 |
| | | 415/191 |
| 2006/0269399 A1* | 11/2006 | Girgis .................... F01D 11/04 |
| | | 415/115 |
| 2013/0108448 A1* | 5/2013 | Ingram .................. F01D 5/143 |
| | | 29/889.7 |
| 2013/0108450 A1* | 5/2013 | Ingram .................. F01D 5/145 |
| | | 416/223 A |
| 2014/0147250 A1* | 5/2014 | Lee ........................ F01D 5/145 |
| | | 416/241 R |
| 2015/0354391 A1* | 12/2015 | Li .......................... F01D 11/08 |
| | | 415/173.1 |
| 2016/0215626 A1* | 7/2016 | Chouhan ................ F01D 5/081 |
| 2016/0215636 A1* | 7/2016 | Chouhan ............... F01D 11/001 |
| 2016/0258295 A1* | 9/2016 | Subramaniyan ...... F01D 11/001 |
| 2016/0281525 A1 | 9/2016 | Nguyen et al. |
| 2016/0326879 A1* | 11/2016 | Chouhan ................ F01D 11/02 |
| 2016/0326889 A1* | 11/2016 | Chouhan ............... F01D 11/001 |
| 2019/0330992 A1 | 10/2019 | Klingels |

\* cited by examiner

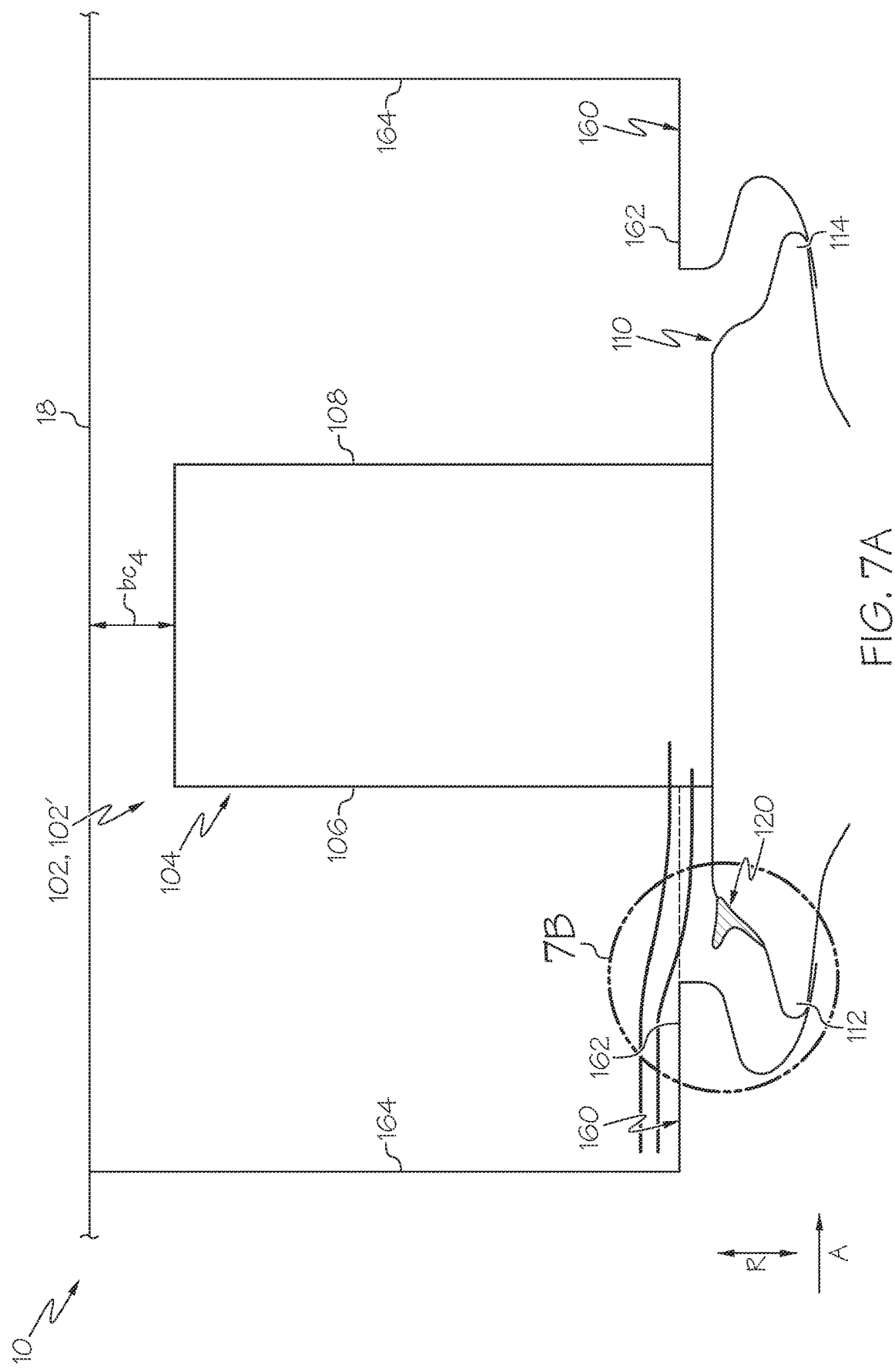

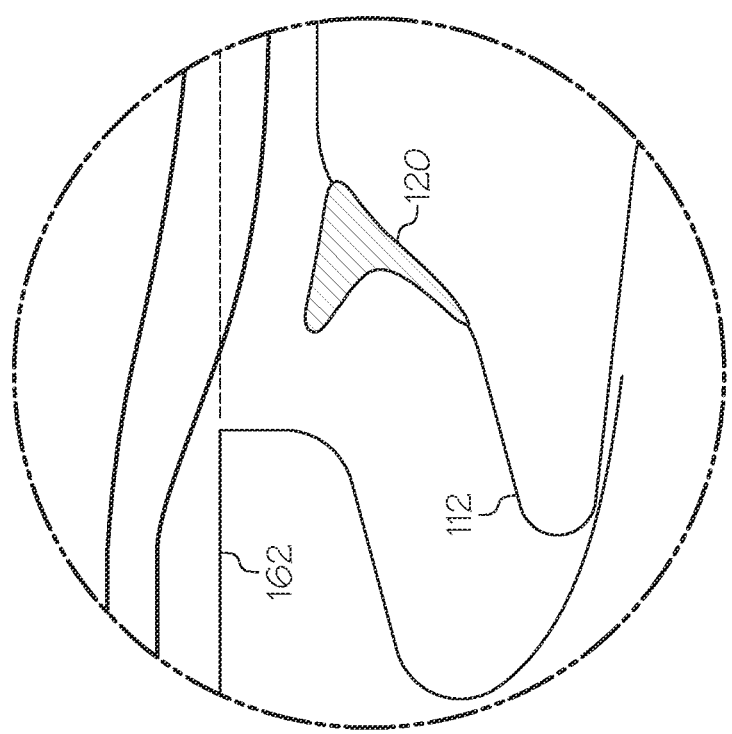

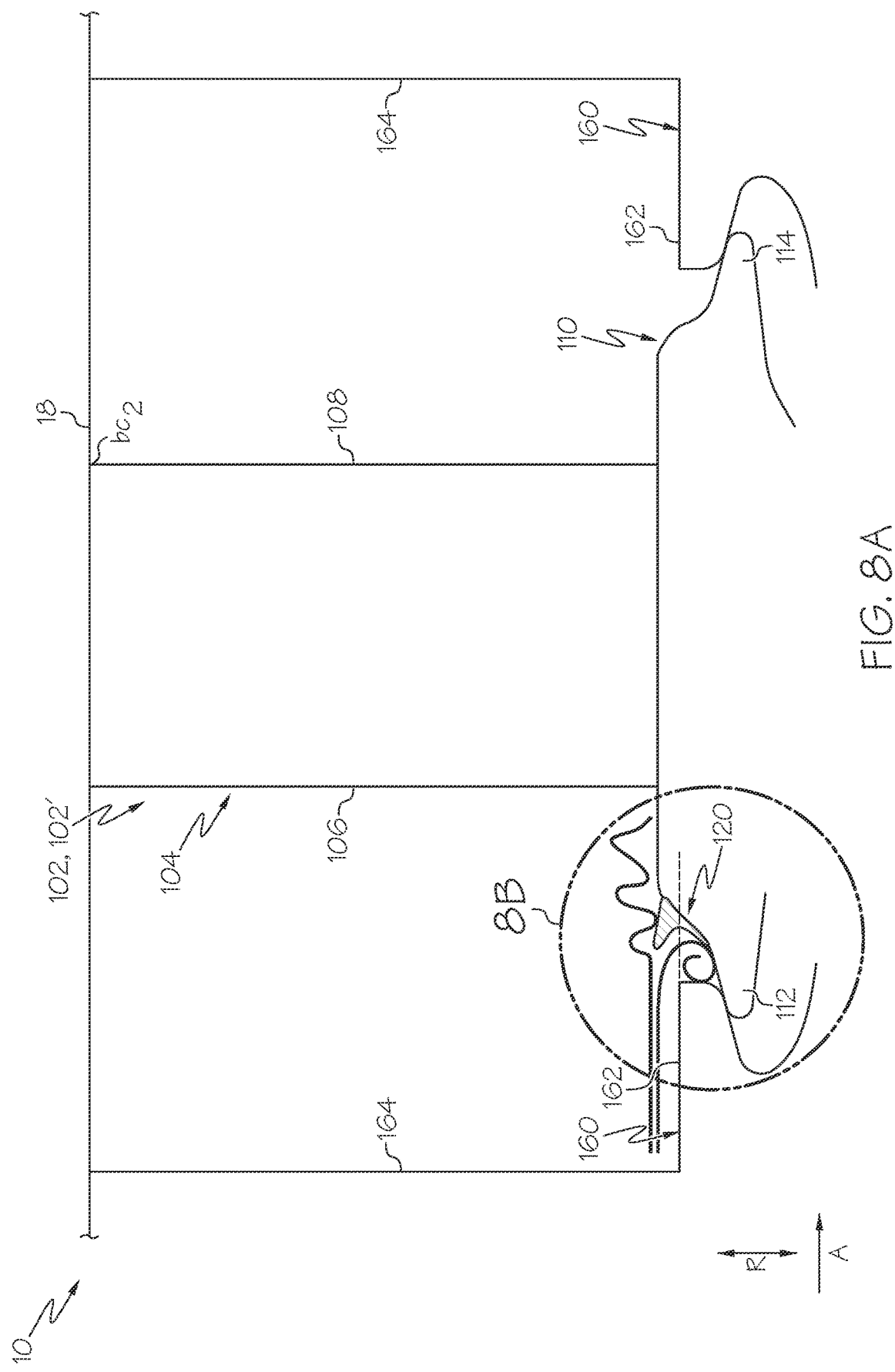

TURBINE BLADES INCLUDING AERO-BRAKE FEATURES AND METHODS FOR USING THE SAME

CROSS REFERENCE TO RELATED APPLICATIONS

The present application claims the benefit of Italian Patent Application No. 102020000018631, filed on Jul. 30, 2020, which is hereby incorporated by reference herein in its entirety.

BACKGROUND

Field

The present disclosure relates to turbine rotors. More particularly, the present disclosure relates to aerodynamic forces inducing an imbalance in a turbine rotor.

Technical Background

Turbine engines are utilized for a variety of applications. For example, turbine engines can be used to drive a generator to produce electrical power, and can be used to provide propulsion to a vehicle, such as an aircraft. Turbine engines generally include a turbine assembly including a turbine shaft and turbine blades that convert axial motion of a gas flowing through the turbine engine into rotational movement of the turbine shaft. The rotor assembly is positioned within an outer shell that at least partially encloses the turbine assembly. However, radial misalignment between the outer shell and the turbine assembly can cause uneven flow of gas through the turbine engine. The uneven flow of gas applies uneven forces to the turbine blades, and can induce rotor whirl, leading to degradation and/or failure of components of the turbine engine. These uneven forces are sometimes known as Alford forces.

BRIEF SUMMARY

Accordingly, a need exists for improved turbine engines that can reduce and/or eliminate uneven flow of gas over the turbine blades resulting from radial misalignment of the rotor assembly with the outer shell. Embodiments of the present disclosure are directed to turbine blades including an aero-brake feature that is selectively exposed to gas flowing through the turbine engine. For example, in some embodiments, the aero-brake feature is exposed to axial gas flow at rotational positions in which the turbine blade is closest to the outer shell, partially disrupting the gas flow through the turbine engine. The aero-brake feature may be positioned inward of a stator platform at rotational positions in which the turbine blade is furthest from the outer shell. By selectively exposing the aero-brake feature and selectively disrupting the axial gas flow, the aero-brake feature may introduce localized aerodynamic losses at discrete rotational positions. The localized aerodynamic losses may offset the uneven flow of the gas, thereby reducing uneven forces acting on the turbine blades and reducing the likelihood of inducing rotor whirl. In other words, by selectively disrupting the axial gas flow, the aero-brake feature may reduce the axial velocity of the gas flow at discrete rotational positions, for example at rotational positions that would otherwise have comparatively high axial velocity gas flow. In this way, the aero-brake feature may assist in reducing uneven flow of gas over the turbine blades, thereby reducing uneven forces acting on the turbine blades.

In one embodiment, a turbine blade includes an airfoil portion extending between a leading edge and a trailing edge, a base portion positioned below the airfoil portion, the base portion including an outwardly-extending wing positioned below the airfoil portion, and an aero-brake feature positioned between the outwardly-extending wing and the airfoil portion and extending outward from the base portion, where the aero-brake feature is structurally configured to disrupt axial airflow across the turbine blade.

In another embodiment, a turbine engine includes an outer shell, one or more stators coupled to and extending inward from the outer shell, each of the one or more stators defining a platform extending in an axial direction, one or more turbine blades including an airfoil portion extending between a leading edge and a trailing edge, an outwardly-extending wing positioned inward from the airfoil portion, and an aero-brake feature positioned between the outwardly-extending wing and the airfoil portion, where the one or more turbine blades and the outer shell define a first blade clearance at a first portion of the outer shell and a second blade clearance at a second portion of the outer shell, the first blade clearance is greater than the second blade clearance, and the aero-brake feature of the one or more turbine blades is positioned outward of the platform of the one or more stators when the one or more turbine blades is positioned at the second portion of the outer shell.

In yet another embodiment, a method for operating a turbine engine includes passing a gas over a platform of a stator to a turbine assembly, thereby rotating the turbine assembly, where the turbine assembly includes one or more turbine blades coupled to a turbine shaft, the one or more turbine blades including an airfoil portion and an aero-brake feature extending outward from the airfoil portion, where the aero-brake feature extends outward from the platform of the stator at a first rotational position and the aero-brake feature is positioned inward from the platform of the stator at a second rotational position that is different from the first rotational position.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 7B schematically depicts an enlarged view of region 7B of FIG. 7A, according to one or more embodiments shown and described herein;

FIG. 8A schematically depicts a side view of the turbine blade and the aero-brake feature of FIG. 3 at a rotational position having a low clearance with the outer shell, according to one or more embodiments shown and described herein;

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to turbine blades including an aero-brake feature that is selectively exposed to gas flowing through the turbine engine. For example, in some embodiments, the aero-brake feature is exposed to axial gas flow at rotational positions in which the turbine blade is closest to the outer shell, partially disrupting the gas flow through the turbine engine. The aero-brake feature may be positioned inward of a stator at rotational positions at which the turbine blade is furthest from the outer shell. By selectively exposing the aero-brake feature and selectively disrupting the axial gas flow, the aero-brake feature may introduce localized aerodynamic losses at discrete rotational positions. The localized aerodynamic losses may offset the uneven flow of the gas, thereby reducing uneven forces acting on the turbine blades and reducing the likelihood of inducing rotor whirl. These and other embodiments will now be described with reference to the appended figures.

Figure 1:
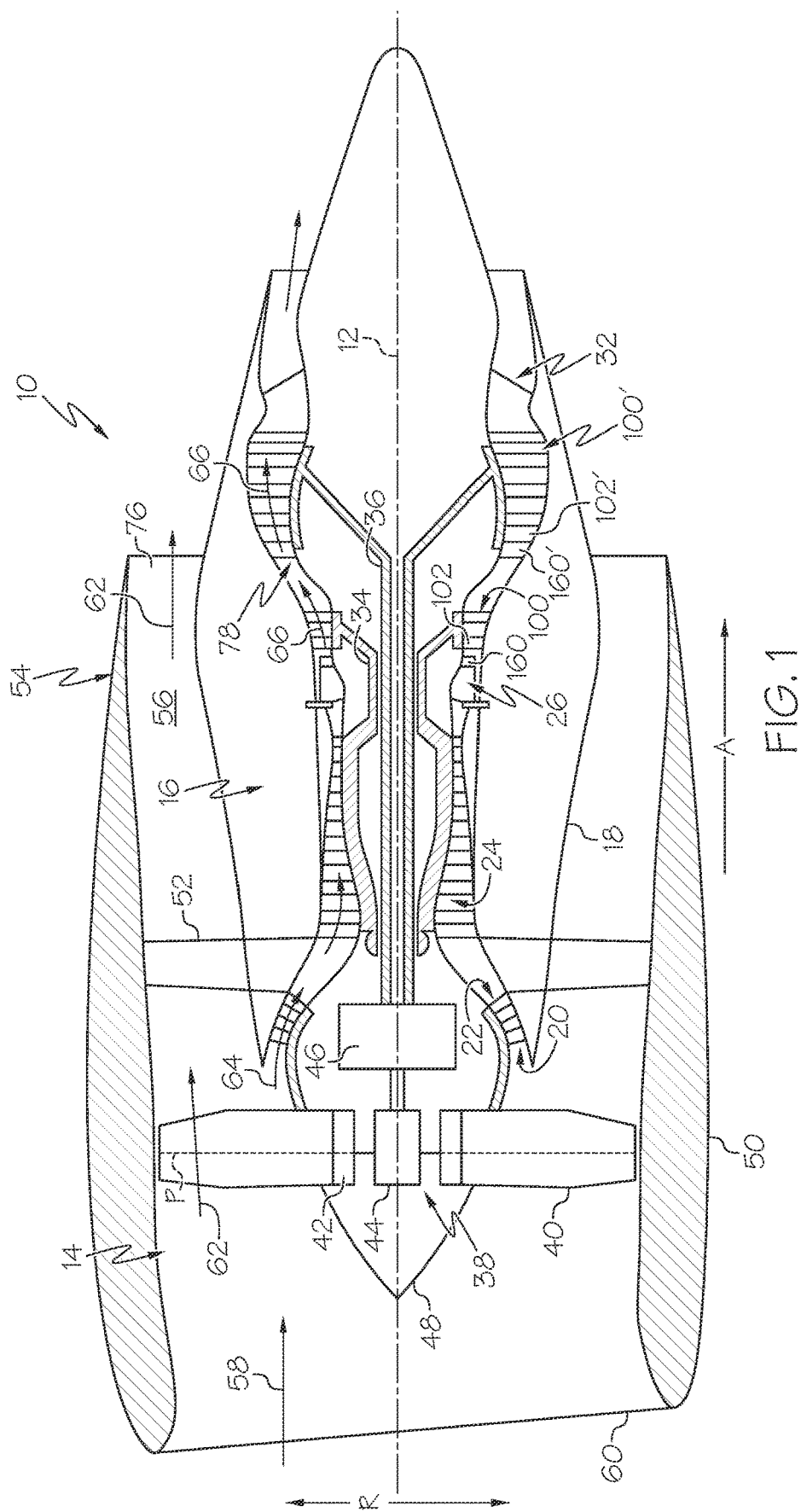
FIG. 1 schematically depicts a section view of a turbine engine, according to one or more embodiments shown and described herein.

Now referring to FIG. 1, a section view of a turbine engine 10 is schematically depicted. As shown in FIG. 1, the turbine engine 10 defines an axial direction A and a radial direction R. In embodiments, the turbine engine 10 includes a fan section 14 and a core engine 16 aft (e.g., rearward in the axial direction A) of the fan section 14.

The exemplary core engine 16 generally includes an outer shell 18 that defines an annular inlet 20. The outer shell 18, in some embodiments, at least partially encloses a compressor section including a booster or low pressure (LP) compressor 22 and/or a high pressure (HP) compressor 24. In some embodiments, the outer shell 18 further at least partially encloses a combustor or combustion section 26, a turbine section including a high pressure (HP) turbine assembly 100 and/or a low pressure (LP) turbine assembly 100', and a jet exhaust nozzle section 32. In some embodiments, a high pressure (HP) shaft or spool 34 drivingly connects the HP turbine assembly 100 to the HP compressor 24. A low pressure (LP) shaft or spool 36, in some embodiments, drivingly connects the LP turbine assembly 100' to the LP compressor 22.

In the embodiment depicted in FIG. 1, the fan section 14 can include variable pitch fan 38 having a plurality of fan blades 40 coupled to a disk 42. As depicted, the fan blades 40 extend outwardly from disk 42 in the radial direction R. In some embodiments, each fan blade 40 is rotatable relative to the disk 42 about a pitch axis P by virtue of the fan blades 40 being operatively coupled to a suitable actuation member 44 configured to collectively vary the pitch of the fan blades 40. The fan blades 40, disk 42, and actuation member 44 are together rotatable about the axial direction A by LP turbine shaft 36 across a power gear box 46. The power gear box 46, in some embodiments, includes a plurality of gears for stepping down the rotational speed of the LP turbine shaft 36.

Referring still to the exemplary embodiment of FIG. 1, the disk 42, in some embodiments, is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core engine 16. It should be appreciated that the outer nacelle 50 may be configured to be supported relative to the core engine 16 by a plurality of circumferentially-spaced outlet guide vanes 52. Moreover, an aft section 54 of the outer nacelle 50 may extend over an outer portion of the core engine 16 so as to define a bypass airflow passage 56 therebetween.

During operation of the turbine engine 10, a volume of air 58 enters the turbine engine 10 through an associated inlet 60 of the outer nacelle 50 and/or fan section 14. As the volume of air 58 passes across the fan blades 40, a first portion of the air 62 is directed or routed into the bypass airflow passage 56 and a second portion of the air 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine assembly 100 where a portion of thermal and/or kinetic energy from the combustion gases 66 is extracted via sequential stages of HP stators 160 that are coupled to the outer shell 18 and HP turbine rotor blades 102 that are coupled to the HP turbine shaft 34, thus causing the HP shaft or spool 34 to rotate, thereby supporting operation of the HP compressor 24. The combustion gases 66 are then routed through the LP turbine assembly 100' where a second portion of thermal and kinetic energy is extracted from the combustion gases 66 via sequential stages of LP stators 160' that are coupled to the outer shell 18 and LP turbine rotor blades 102' that are coupled to the LP turbine shaft 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbine engine 10, also providing propulsive thrust. The HP turbine assembly 100, the LP turbine assembly 100', and the jet exhaust nozzle section 32 at least partially define a hot gas path 78 for routing the combustion gases 66 through the core engine 16.

It should be appreciated that the exemplary turbofan turbine engine 10 depicted in FIG. 1 is by way of example only and that in other exemplary embodiments, the turbine engine 10 may have any other suitable configuration. For example, it should be appreciated that in other exemplary embodiments, the turbine engine 10 may instead be configured as any other suitable turbine engine, such as a turboprop engine, turbojet engine, internal combustion engine, etc.

Figure 2:
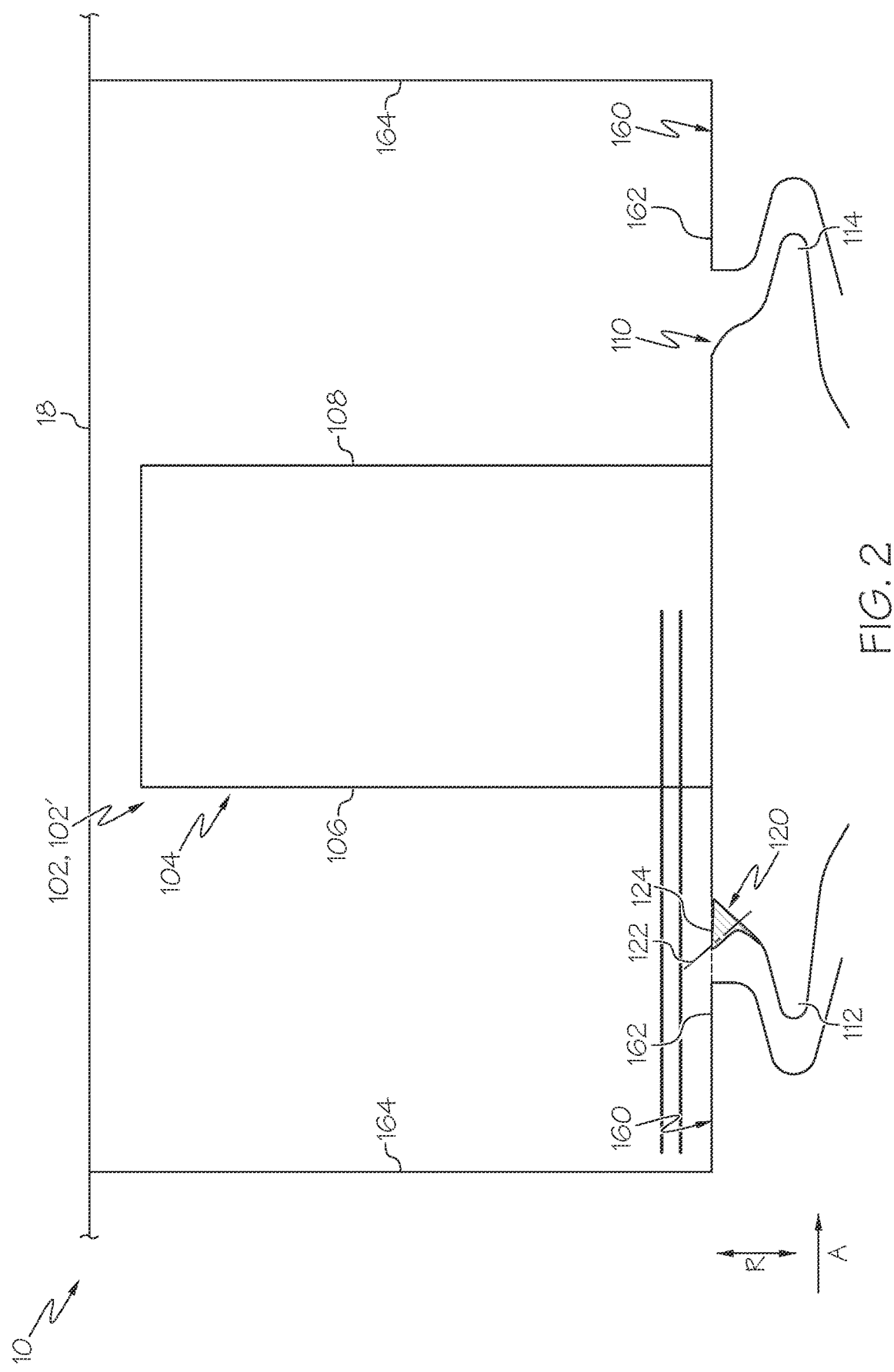
FIG. 2 schematically depicts a side view of a turbine blade of the turbine engine of FIG. 1 including an aero-brake feature, according to one or more embodiments shown and described herein.

Referring to FIG. 2, a side view of a turbine blade 102 is schematically depicted. The turbine blade 102 depicted in FIG. 2 may be a HP turbine blade 102 (FIG. 1) or a LP turbine blade 102' (FIG. 1), and in embodiments described herein, either or both of the HP turbine blades 102 (FIG. 1) and the LP turbine blades 102' (FIG. 1) of the turbine engine 10 may include features as described and depicted with reference to FIG. 2. Similarly, in embodiments described herein, fan blades of either or both of the LP compressor 22 (FIG. 1) or the HP compressor 24 (FIG. 1) may include features as described and depicted with reference to FIG. 2.

In embodiments, the turbine blade 102 is positioned between one or more stators 160. The stators 160 depicted in FIG. 2 may be HP stators 160 (FIG. 1) or LP stators 160' (FIG. 1), and in embodiments described herein either or both of the HP stators 160 (FIG. 1) and the LP stators 160' (FIG. 1) of the turbine engine 10 may include features as described and depicted with reference to FIG. 2. In embodiments, the stators 160 are coupled to the outer shell 18. For example, in some embodiments, the stators 160 include a stator vane 164 that is coupled to and extends inward from the outer shell 18. The stators 160, in embodiments, further include a platform 162 that extends in the axial direction.

The turbine blade 102 includes an airfoil portion 104 extending between a leading edge 106 and a trailing edge 108, for example, in the axial direction A. The turbine blade 102 further includes a base portion 110 positioned below the airfoil portion 104. When assembled to the turbine engine 10, the base portion 110 is positioned inward of the airfoil portion 104 in the radial direction R. The base portion 110 generally includes an outwardly-extending wing positioned below/inward of the airfoil portion 104. In the embodiment depicted in FIG. 3, the base portion 110 includes a forwardly-extending wing 112 positioned below/inward of the airfoil portion 104, and a rearwardly-extending wing 114 positioned below/inward of the airfoil portion 104, the forwardly-extending wing 112 positioned forward of the rearwardly-extending wing 114 in the axial direction A.

Figure 3:
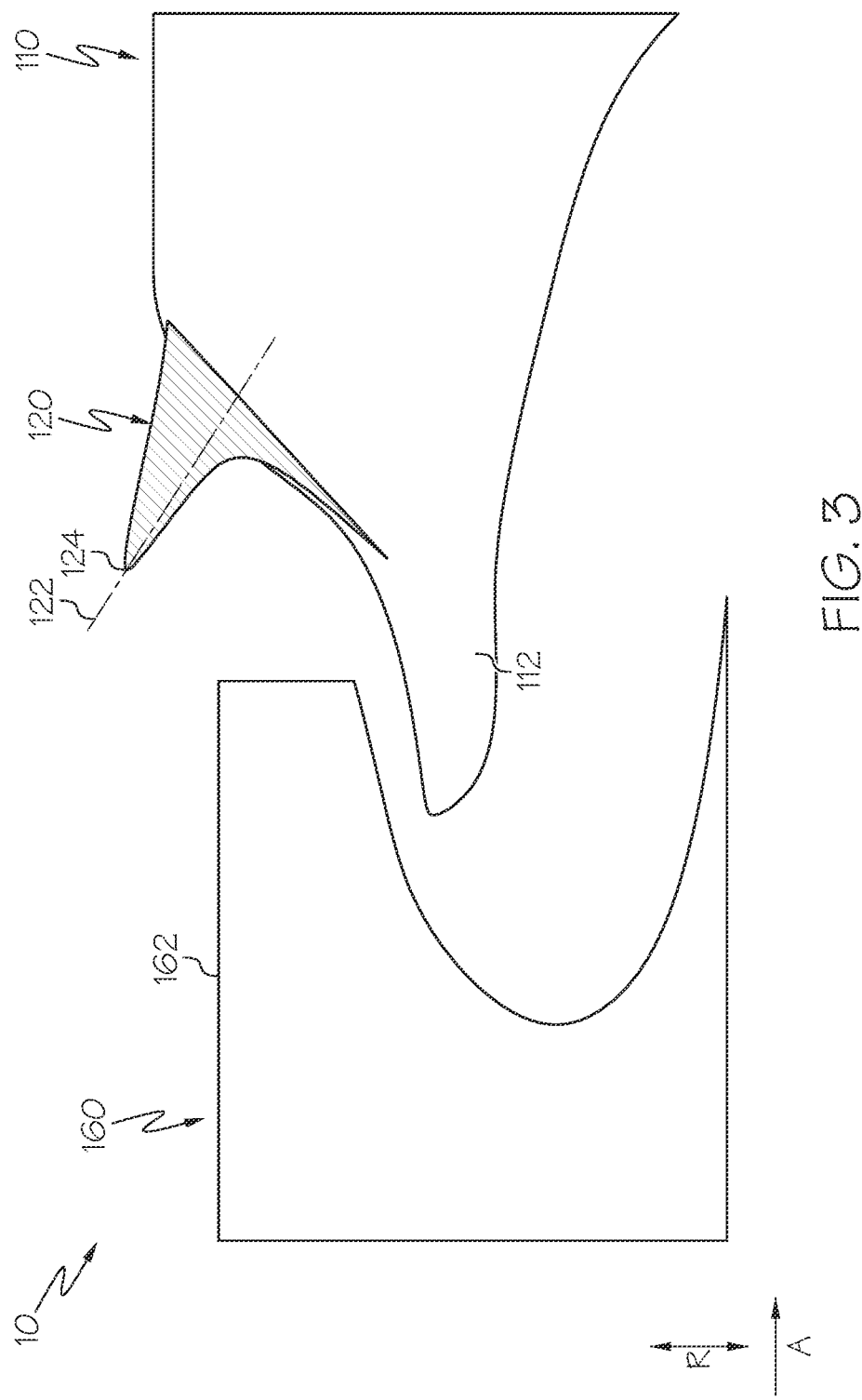
FIG. 3 schematically depicts an enlarged side view of the aero-brake feature of FIG. 2, according to one or more embodiments shown and described herein.

Referring to FIGS. 2 and 3, the turbine blade 102 further includes an aero-brake feature 120 positioned between the outwardly-extending wing and the airfoil portion 104. For example, in the embodiment depicted in FIG. 2, the aero-brake feature 120 is positioned between the airfoil portion 104 and the forwardly-extending wing 112 in the radial direction R, and positioned between the airfoil portion 104 and the rearwardly-extending wing 114 in the radial direction R. In embodiments, the aero-brake feature 120 is structurally configured to disrupt airflow across the turbine blade 102, as described in greater detail herein. While in the embodiment depicted in FIGS. 2 and 3, the aero-brake feature 120 is positioned forward of the leading edge 106 of the airfoil portion 104 in the axial direction A, it should be understood that this is merely an example. In some embodiments, the turbine blade 102 may include an aero-brake feature 120 positioned at any axial location of the turbine blade 102 between the airfoil portion 104 and the forwardly-extending wing 112 in the radial direction R and/or between the airfoil portion 104 and the rearwardly-extending wing 114 in the radial direction R. In some embodiments, the aero-brake feature 120 may be positioned between the trailing edge 108 of the airfoil portion 104 and the rearwardly-extending wing 114, and may be positioned rearward of the trailing edge 108 in the axial direction A. In some embodiments, the aero-brake feature 120 is an axially-discrete feature on the turbine blade 102. As used herein the term "axially-discrete" means that the aero-brake feature 120 makes the turbine blade 102 asymmetrical about a centerline bisecting the turbine blade 102 in the axial direction A.

In some embodiments, the aero-brake feature 120 defines an aero-brake axis 122 extending outward from the base portion 110 of the turbine blade 102. For example, in some embodiments, the aero-brake feature 120 defines a peak 124 extending outward from the base portion 110, and the peak 124 defines the aero-brake axis 122. In some embodiments, the aero-brake axis 122 is oriented transverse to at least one of the leading edge 106 and the trailing edge 108 of the airfoil portion 104. For example, in the embodiment depicted in FIGS. 3 and 4, the aero-brake axis 122 extends outward from the base portion 110 and upward from the base portion 110. Put another way, in the embodiment depicted in FIGS. 3 and 4, the aero-brake axis 122 extends axially outward (e.g., in the axial direction A) and radially outward (e.g., in the radial direction R) from the base portion 110.

In some embodiments, the aero-brake feature 120 is asymmetrical about the aero-brake axis 122. For example and referring to FIG. 4, a perspective view of the aero-brake feature 120 is shown in isolation. In embodiments, the aero-brake feature 120 defines a leading face 126 and a trailing face 128 oriented opposite the leading face 126. In some embodiments, at least one of the leading face 126 and the trailing face 128 define a concave surface, while the other of the leading face 126 and the trailing face 128 does not include a concave surface. For example, in the embodiment depicted in FIG. 4, the leading face 126 of the aero-brake feature 120 defines the concave surface, while the trailing face 128 does not include a concave surface. However, in some embodiments, the aero-brake feature 120 is symmetrical about the aero-brake axis 122.

Figure 4:
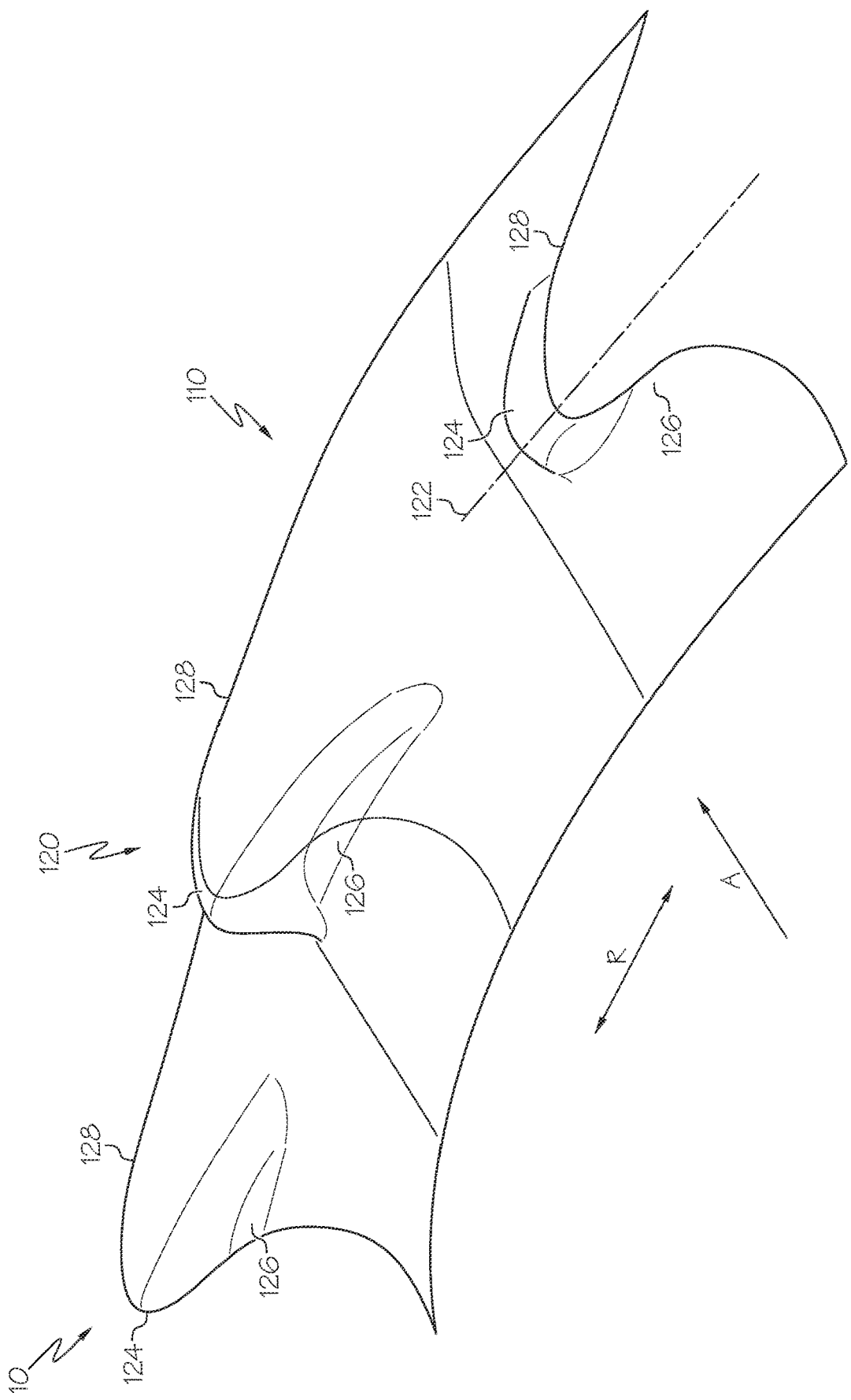
FIG. 4 schematically depicts a perspective view of an aero-brake feature, according to one or more embodiments shown and described herein.

In some embodiments and as depicted in FIG. 4, the aero-brake feature 120 includes one or more peaks 124. For example, in the embodiment depicted in FIG. 4, the aero-brake feature 120 defines peaks 124 that form a serpentine shape extending across the base portion 110.

In embodiments, the aero-brake feature 120 assists in locally disrupting the flow of gas across the turbine blade 102 (FIG. 2). By locally disrupting the flow of gas across the turbine blade 102 (FIG. 2), local drag losses can be selectively introduced, and the local drag losses may assist in offsetting uneven forces acting on the turbine blade 102, for example as the result of turbine mis-alignment with the outer shell 18 (FIG. 2).

Figure 5B:
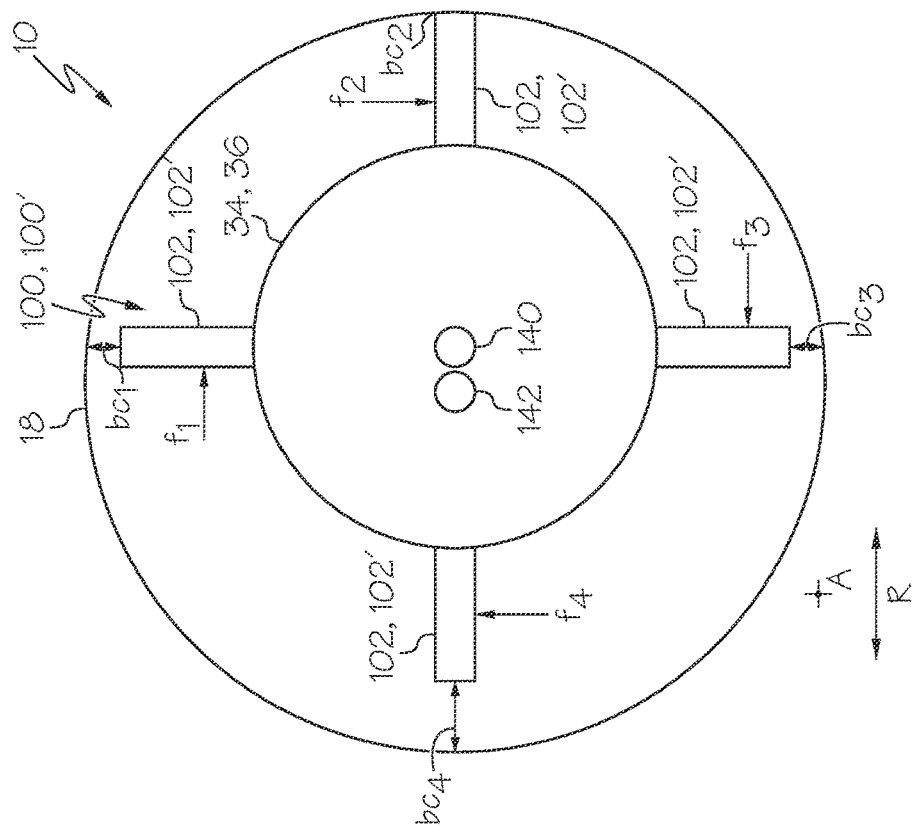
FIG. 5B schematically depicts another section view of the turbine engine of FIG. 1 with the turbine assembly offset from the outer shell, according to one or more embodiments shown and described herein.
Figure 5A:
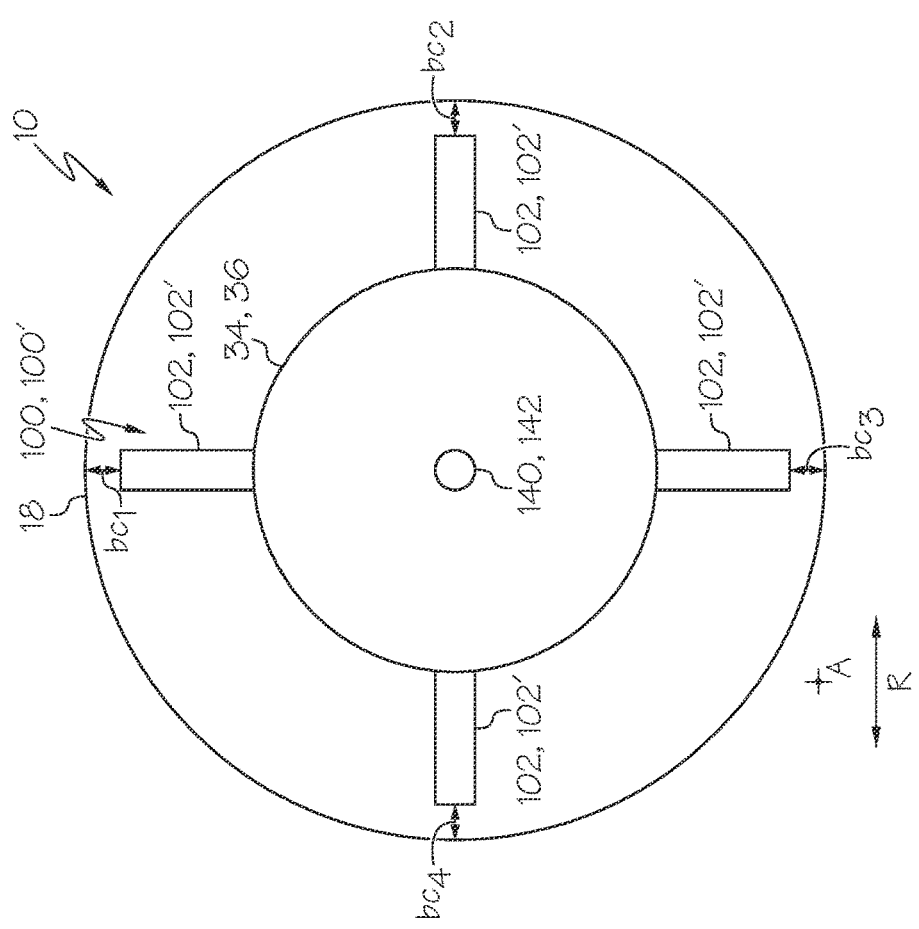
FIG. 5A schematically depicts a section view of the turbine engine of FIG. 1 with a turbine assembly aligned with an outer shell, according to one or more embodiments shown and described herein.

For example, and referring to FIG. 5A, a front-section view of the turbine engine 10 is depicted. The front-section view depicted in FIG. 5A shows a section view of the HP turbine assembly 100 including the HP turbine shaft 34 and the HP turbine blades 102, however, it should be understood that in embodiments described herein, the LP turbine assembly 100' including the LP turbine shaft 36 and the LP turbine blades 102' may include similar constructions. The HP turbine shaft 34 defines a turbine assembly axis 140 and the outer shell 18 defines an outer shell axis 142 extending in the axial direction, in embodiments. In the example depicted in FIG. 5A, the turbine assembly axis 140 is aligned with the outer shell axis 142. For example, FIG. 5A depicts four example turbine blades 102 positioned around the HP turbine shaft 34, and each of the example turbine blades 102 define a blade clearance be evaluated between the turbine blades 102 and the outer shell 18. In particular, as shown in FIG. 5A, the four turbine blades 102 define blade clearances $bc_1$, $bc_2$, $bc_3$, and $bc_4$. Because the turbine assembly axis 140 is aligned with the outer shell axis 142, the HP turbine shaft 34 is generally concentric with the outer shell 18, and each of the blade clearances $bc_1$-$bc_4$ are generally the same.

However, the turbine assembly axis 140 may not be perfectly aligned with the outer shell axis 142, for example, as the result of manufacturing tolerances, engine wear, imbalance, bearing clearances, or the like. For example and referring to FIG. 5B, another view of the HP turbine assembly 100 is depicted, with the turbine assembly axis 140 of the HP turbine shaft 34 offset from the outer shell axis 142 of the outer shell 18. In the example depicted in FIG. 5B, the turbine assembly axis 140 is positioned closer to the outer shell 18 at the portion out the outer shell 18 where the turbine blade 102 has the blade clearance $bc_2$, as compared to the portions of the outer shell 18 where the turbine blade 102 has the blade clearances $bc_1$, $bc_3$, and $bc_4$. From another perspective, the turbine assembly axis 140 is offset from the outer shell axis 142, and the blade clearances $bc_1$-$bc_4$ are not the same. In the example depicted in FIG. 5B, $bc_4 > bc_1 > bc_2$, and $bc_4 > bc_3 > bc_2$.

Without being bound by theory, as gas passes through the turbine engine 10 in the axial direction A, the axial velocity of the gas is influenced by the clearance between the outer shell 18 and the turbine blades 102 and/or the HP turbine shaft 34, for example as the result of the Bernoulli effect. As an example, gas passing through the turbine engine 10 may have a velocity $v_1$ at the turbine blade 102 with the blade clearance $bc_1$, a velocity $v_2$ at the turbine blade 102 with the blade clearance $bc_2$, a velocity $v_3$ at the turbine blade 102 with the blade clearance $bc_3$, and a velocity $v_4$ at the turbine blade 102 with the blade clearance $bc_4$. In the example depicted in FIG. 2B, as the result of the Bernoulli effect, $v_2 > v_1 > v_4$, and $v_2 > v_3 > v_4$.

Because the gas passing through the turbine engine 10 has different axial velocities $v_1$-$v_4$, the gas passing through the turbine engine 10 imparts different forces on the turbine blades 102. For example the gas passing through the turbine engine 10 may impart a force $f_1$ on the turbine blade 102 with the blade clearance $bc_1$, a force $f_2$ on the turbine blade 102 with the blade clearance $bc_2$, a force $f_3$ on the turbine blade 102 with the blade clearance $bc_3$, and a force $f_4$ on the turbine blade 102 with the blade clearance $bc_4$. In the example depicted in FIG. 5B, as the result of the Bernoulli effect $f_2 > f_1 > f_4$, and $f_2 > f_3 > f_4$. The inconsistent forces can degrade components and performance of the turbine engine 10, and can introduce rotor whirl, which can lead to failure of the turbine blades 102 and/or rotor instability.

Figure 6:
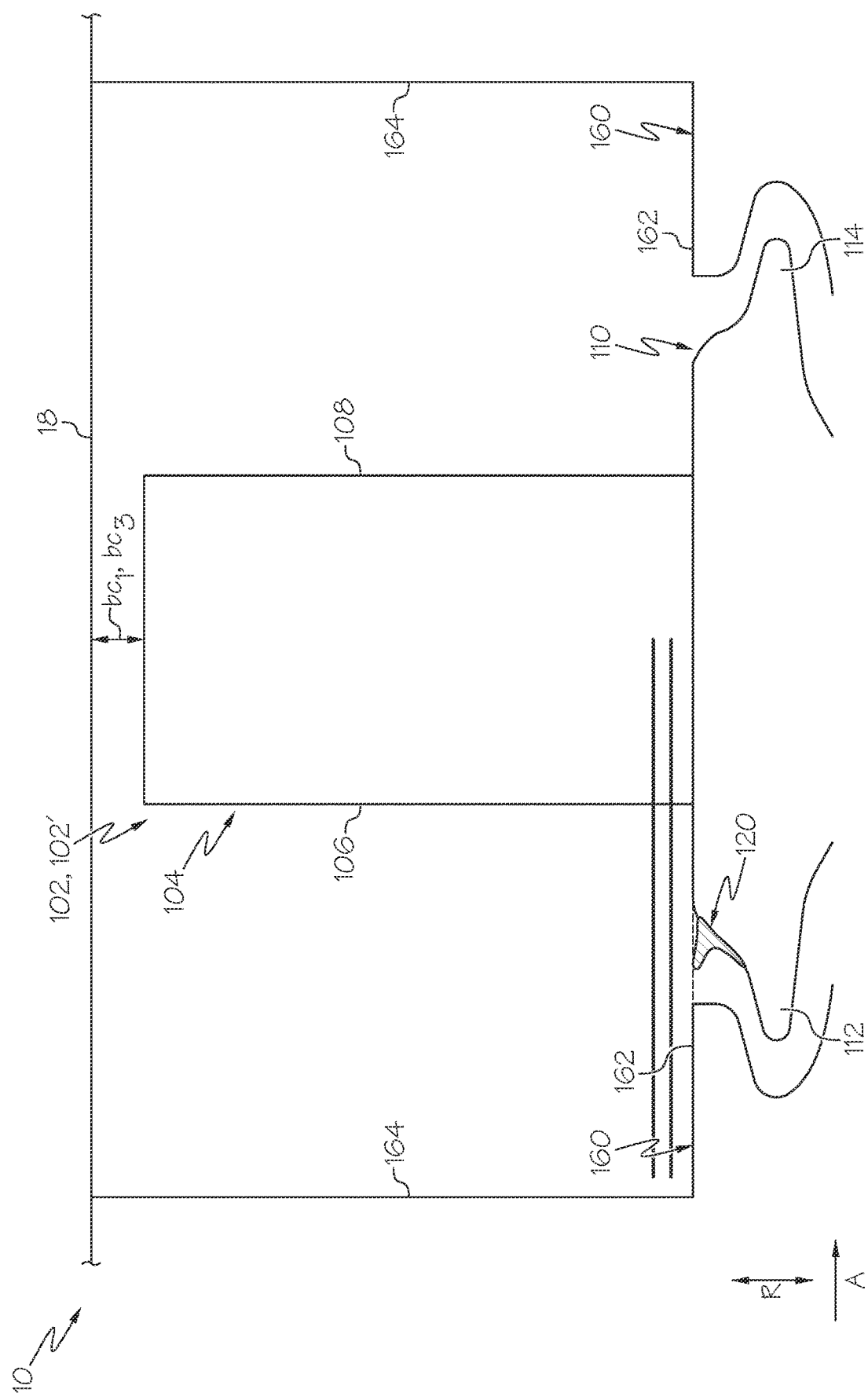
FIG. 6 schematically depicts a side view of the turbine blade and the aero-brake feature of FIG. 3 at a rotational position having nominal clearance with the outer shell, according to one or more embodiments shown and described herein FIG. 7A schematically depicts a side view of the turbine blade and the aero-brake feature of FIG. 3 at a rotational position having a high clearance with the outer shell, according to one or more embodiments shown and described herein.

Referring to FIGS. 5B and 6, a side view of a turbine blade 102 with the blade clearance $bc_1$ or the blade clearance $bc_3$ is depicted. Because the stators 160 are coupled to the outer shell 18, alignment between the outer shell 18 and the turbine blades 102 generally corresponds to an alignment between the stators 160 and the turbine blades 102 in the radial direction R. In other words, each of the stators 160 extend radially inward from the outer shell 18, and accordingly, the radial position of the turbine blades 102 with respect to the stators 160 relates to the clearance between the turbine blades 102 and the outer shell 18. In embodiments, at positions in which the turbine blades 102 have a comparatively high clearance with the outer shell 18, components of the turbine blades 102 may be positioned radially inward of corresponding components of the stators 160. However, at positions at which the turbine blades 102 have a comparatively low clearance with the outer shell 18, components of the turbine blades 102 may be positioned radially outward of corresponding components of the stators 160.

For example, at portions of the outer shell 18 at which the turbine blade 102 has a nominal blade clearance (e.g., $bc_1$ or $bc_3$), the aero-brake feature 120 of the turbine blade 102 is aligned with or positioned inward of the platform 162 of the one or more stators 160 in the radial direction R. Because the aero-brake feature 120 is aligned with or positioned inward of the platform 162 of the one or more stators 160, the aero-brake feature 120 may provide minimal or no disruption of the flow of gas through the turbine engine 10 in the axial direction A.

Referring to FIGS. 5B, 7A, and 7B, a side view of the turbine blade 102 with the blade clearance $bc_4$ is depicted. In embodiments, portions of the turbine blade 102 may be positioned radially inward of corresponding portions of the stators 160 at portions of the outer shell 18 at which the turbine blade 102 has a large blade clearance (e.g., $bc_4$), as compared to portions of the outer shell 18 at which the turbine blade 102 is closer to the outer shell 18 and has a smaller clearance (e.g., $bc_1$, $bc_3$). In particular, at portions of the outer shell 18 at which the turbine blade 102 has a large blade clearance (e.g., $bc_4$), the aero-brake feature 120 of the turbine blade 102 is positioned inward of the platform 162 of the one or more stators 160 in the radial direction R. Because the aero-brake feature 120 is positioned inward of the platform 162 of the one or more stators 160, the aero-brake feature 120 may provide minimal or no disruption of the flow of gas through the turbine engine 10 in the axial direction A.

Figure 8B:
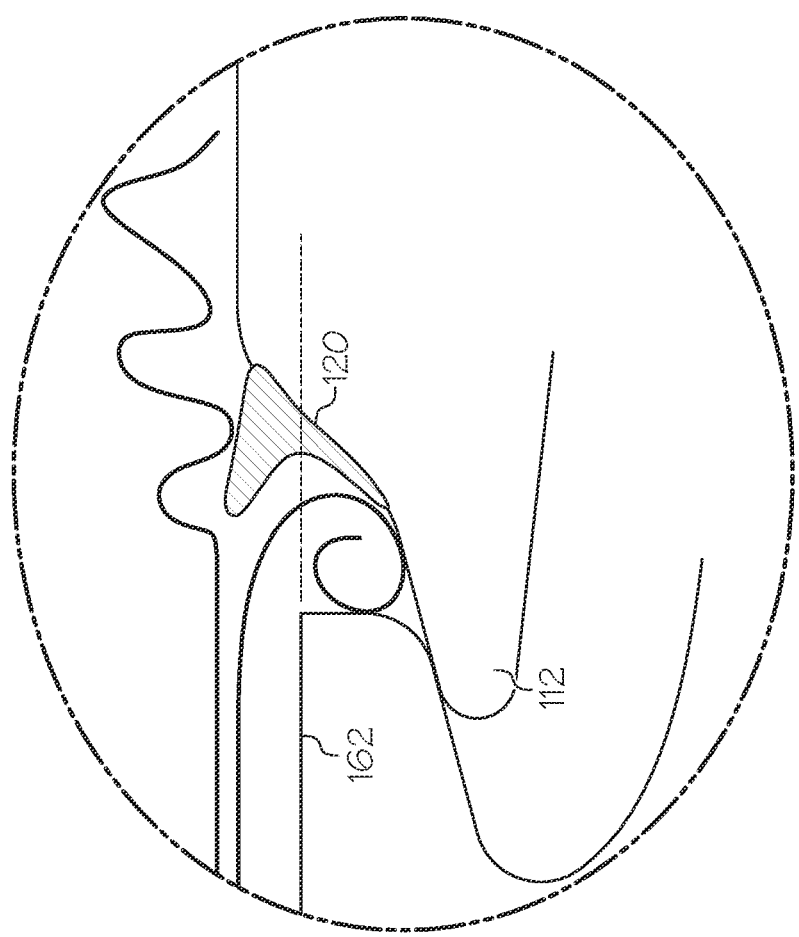
FIG. 8B schematically depicts an enlarged view of region 8B of FIG. 8A, according to one or more embodiments shown and described herein.

Referring to FIGS. 5B, 8A, and 8B, a side view of the turbine blade 102 with the blade clearance $bc_2$ is depicted. In embodiments, portions of the turbine blade 102 may be positioned radially outward of corresponding portions of the stators 160 at portions of the outer shell 18 at which the turbine blade 102 has a small blade clearance (e.g., $bc_2$) as compared to portions of the outer shell 18 at which the turbine blade 102 is further from the outer shell 18 and has a larger clearance (e.g., $bc_1$, $bc_3$, $bc_4$). In particular, of the outer shell 18 at which the turbine blade 102 has a small blade clearance (e.g., $bc_2$), the aero-brake feature 120 of the turbine blade 102 is positioned outward of the platform 162 of the one or more stators 160 in the radial direction R. Because the aero-brake feature 120 is positioned outward of the platform 162 of the one or more stators 160, the aero-brake feature 120 at least partially disrupts the flow of gas through the turbine engine 10 in the axial direction A. In this way, the aero-brake feature 120 is extended outward from the platform 162 of the stator 160 at positions at which the turbine blade 102 has a small blade clearance (e.g., $bc_2$), and is retracted inward from the platform of the stator 160 at positions at which the turbine blade 102 has a larger blade clearance (e.g., $bc_1$, $bc_3$, $bc_4$).

Accordingly, the aero-brake feature 120 may provide minimal or no disruption of the flow of gas through the turbine engine 10 at portions of the outer shell 18 having a nominal or large blade clearance (e.g., FIGS. 6, 7A), while at least partially disrupting the flow of gas through the turbine engine 10 at portions of the outer shell 18 having comparatively small blade clearance (e.g., FIG. 8A). The disruption of flow of gas through the turbine engine 10 at portions of the outer shell 18 at which the turbine blade 102 has a comparatively small blade clearance (e.g., $bc_2$, FIG. 5B) may introduce drag at least partially offsetting the increased velocity of the gas at portions of the outer shell 18 at which the turbine blade 102 has the comparatively small blade clearance (e.g., $bc_2$, FIG. 5B). By at least partially offsetting the increased velocity of the gas at portions of the outer shell 18 at which the turbine blade 102 has the comparatively small blade clearance (e.g., $bc_2$, FIG. 5B), the force acting on the turbine blade 102 can be locally decreased. In this way, increased forces acting on the turbine blade 102 as the result of radial misalignment between the outer shell 18 and the turbine shaft 34, 36 (FIG. 5B) can be locally reduced by the aero-brake feature 120.

Figure 9B:
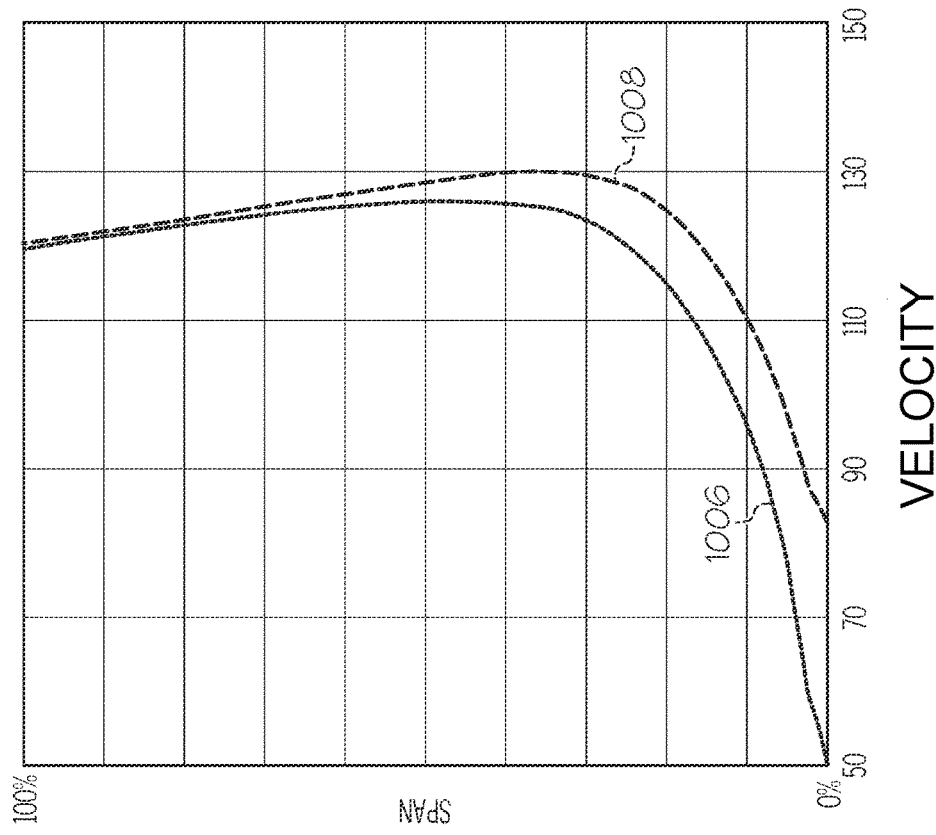
FIG. 9B depicts the velocity of gas passing through an example turbine engine at a position of reduced clearance between the turbine blade and the outer shell, according to one or more embodiments shown and described herein.
Figure 9A:
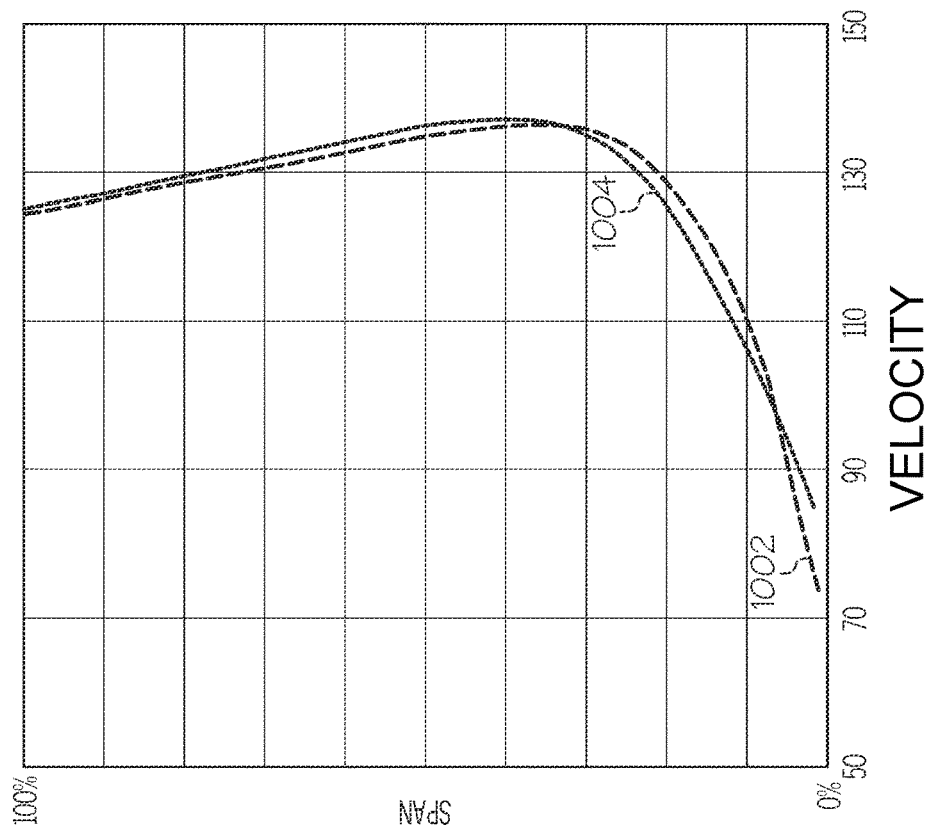
FIG. 9A depicts the velocity of gas passing through an example turbine engine at a position of nominal clearance between the turbine blade and the outer shell, according to one or more embodiments shown and described herein.

Referring to FIGS. 1, 2, 9A, and 9B, axial velocity of gas passing through the turbine assembly 100, 100' is depicted, showing the impact of selective exposure of the aero-brake feature 120. In particular, FIGS. 9A and 9B depict the axial velocity of gas passing across a turbine blade 102, 102' evaluated at the leading edge 106, with the axial velocity of the gas depicted as a function of a percentage span of the turbine blade 102, 102' extending outward in the radial direction from the base portion 110. FIG. 9A depicts the axial velocity of the gas passing across the turbine blade 102, 102' at a position of nominal clearance between the turbine blade 102, 102' and the outer shell 18 (e.g., $bc_1$, $bc_3$ FIG. 5B). Line 1002 depicts the axial velocity profile of a turbine blade 102, 102' including the aero-brake feature 120, and line 1004 depicts the axial velocity profile of a turbine blade that does not include the aero-brake feature 120. As shown in FIG. 9A, because the aero-brake feature 120 is aligned with or positioned inward of the platform 162 of the one or more stators 160, the aero-brake feature 120 may provide minimal or no disruption of the flow of gas through the turbine assembly 100, 100' in the axial direction A. As such, at positions where the turbine blade 102, 102' has a nominal clearance with respect to the outer shell 18, the aero-brake feature 120 has minimal impact on the axial velocity of gas passing through the turbine assembly 100, 100', as compared to turbine blades that do not include the aero-brake feature 120.

By contrast, FIG. 9B depicts the axial velocity of the gas passing across the turbine blade 102, 102' at a position of reduced clearance between the turbine blade 102, 102' and the outer shell 18 (e.g., $bc_2$, FIG. 5B). In particular, FIG. 9B depicts the axial velocity profile across a turbine blade 102, 102' that has approximately 0.381 millimeters less clearance than the turbine blade 102, 102' depicted in FIG. 9A. Line 1006 depicts the axial velocity profile of a turbine blade 102, 102' including the aero-brake feature 120, and line 1008 depicts the axial velocity profile of a turbine blade that does not include the aero-brake feature 120. As shown in FIG. 9B, because the aero-brake feature 120 is exposed and positioned outward of the platform 162 of the one or more stators 160, the aero-brake feature 120 may disrupt the flow of gas through turbine assembly 100, 100' in the axial direction A near the base portion 110. As such, the aero-brake feature 120 can locally reduce axial velocity of gas passing through the turbine assembly 100, 100' at positions with reduced clearance between the turbine blade 102, 102' and the outer shell (e.g., $bc_2$, FIG. 5B), as compared to turbine blades that do not include the aero-brake feature 120. By locally reducing the axial velocity of gas passing through the turbine assembly 100, 100', the aero-brake feature may reduce the impact of increased axial velocity of the gas passing through the turbine assembly 100, 100' attributable to the Bernoulli effect.

Accordingly, it should now be understood that embodiments of the present disclosure are directed to turbine blades including an aero-brake feature that is selectively exposed to gas flowing through the turbine engine. For example, in some embodiments, the aero-brake feature is exposed to axial gas flow at rotational positions in which the turbine blade is closest to the outer shell, partially disrupting the gas flow through the turbine engine. The aero-brake feature may be positioned inward from a stator platform at rotational positions in which the turbine blade is furthest from the outer shell. By selectively exposing the aero-brake feature and selectively disrupting the axial gas flow, the aero-brake feature may introduce localized aerodynamic losses at discrete rotational positions. The localized aerodynamic losses may offset the uneven flow of the gas, thereby reducing uneven forces acting on the turbine blades and reducing the likelihood of inducing rotor whirl.

Further aspects of the embodiments are provided by the subject matter of the following clauses:

1. A turbine blade comprising an airfoil portion extending between a leading edge and a trailing edge, a base portion positioned below the airfoil portion, the base portion comprising an outwardly-extending wing positioned below the airfoil portion, and a discrete aero-brake feature positioned between the outwardly-extending wing and the airfoil portion and extending outward from the base portion, wherein the aero-brake feature is structurally configured to disrupt axial airflow across the turbine blade.

2. The turbine blade of any preceding clause, wherein the aero-brake feature defines an aero-brake axis extending outward from the base portion, and wherein the aero-brake feature is asymmetric about the aero-brake axis.

3. The turbine blade of any preceding clause, wherein the aero-brake feature defines a peak extending outward from the base portion, wherein the peak defines an aero-brake axis that is oriented transverse to at least one of the leading edge and the trailing edge of the airfoil portion.

4. The turbine blade of any preceding clause, wherein the aero-brake axis extends outward from the base portion and upward from the base portion.

5. The turbine blade of any preceding clause, wherein the aero-brake feature defines a leading face and a trailing face oriented opposite the leading face, wherein at least one of the leading face and the trailing face defines a concave surface.

6. The turbine blade of any preceding clause, wherein the leading face comprises the concave surface.

7. The turbine blade of any preceding clause, wherein the aero-brake feature defines one or more peaks defining a serpentine shape extending across the base portion.

8. A turbine engine comprising an outer shell, one or more stators coupled to and extending inward from the outer shell, each of the one or more stators defining a platform extending in an axial direction, one or more turbine blades comprising an airfoil portion extending between a leading edge and a trailing edge, an outwardly-extending wing positioned inward from the airfoil portion, and an aero-brake feature positioned between the outwardly-extending wing and the airfoil portion, wherein the one or more turbine blades and the outer shell define a first blade clearance at a first portion of the outer shell and a second blade clearance at a second portion of the outer shell, the first blade clearance is greater than the second blade clearance, and the aero-brake feature of the one or more turbine blades is positioned outward of the platform of the one or more stators when the one or more turbine blades is positioned at the second portion of the outer shell.

9. The turbine engine of any preceding clause, wherein the aero-brake feature of the one or more turbine blades is positioned inward of the platform of the one or more stators when the one or more turbine blades is positioned at the first portion of the outer shell.

10. The turbine engine of any preceding clause, wherein the aero-brake feature is structurally configured to disrupt airflow across the one or more turbine blades.

11. The turbine engine of any preceding clause, further comprising a turbine assembly comprising a turbine shaft extending in the axial direction and defining a turbine assembly axis, wherein the one or more turbine blades are coupled to the turbine shaft.

12. The turbine engine of any preceding clause, wherein the turbine assembly axis is positioned closer to the second portion of the outer shell than the first portion of the outer shell.

13. The turbine engine of any preceding clause, wherein the aero-brake feature defines an aero-brake axis extending outward from the one or more turbine blades, and wherein the aero-brake feature is asymmetric about the aero-brake axis.

14. The turbine engine of any preceding clause, wherein the aero-brake axis extends axially and radially outward from the one or more turbine blades.

15. The turbine engine of any preceding clause, wherein the aero-brake feature defines a leading face and a trailing face oriented opposite the leading face, wherein at least one of the leading face and the trailing face defines a concave surface.

16. The turbine engine of any preceding clause, wherein the leading face comprises the concave surface.

17. The turbine engine of any preceding clause, wherein the aero-brake feature defines one or more peaks defining a serpentine shape extending across the one or more turbine blades.

18. A method for operating a turbine engine, the method comprising passing a gas over a platform of a stator to a turbine assembly, thereby rotating the turbine assembly, wherein the turbine assembly comprises one or more turbine blades coupled to a turbine shaft, the one or more turbine blades comprising an airfoil portion and an aero-brake feature extending outward from the airfoil portion, wherein the aero-brake feature extends outward from the platform of the stator at a first rotational position and the aero-brake feature is positioned inward from the platform of the stator at a second rotational position that is different from the first rotational position.

19. The method of any preceding clause, further comprising disrupting a flow of gas with the aero-brake feature at the first rotational position.

20. The method of any preceding clause, wherein the one or more turbine blades are positioned closer to an outer shell of the turbine engine at the first rotational position.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A turbine blade comprising:
an airfoil portion extending between a leading edge and a trailing edge;
a base portion positioned below the airfoil portion, the base portion comprising:
an outwardly-extending wing positioned below the airfoil portion; and
an axially-discrete aero-brake feature positioned between the outwardly-extending wing and the airfoil portion and extending outward from the base portion, wherein the axially-discrete aero-brake feature is structurally configured to disrupt axial airflow across the turbine blade when the turbine blade is positioned at a first radial position and is prevented from disrupting the axial airflow across the turbine blade when the turbine blade is positioned at a second radial position.

2. The turbine blade of claim 1, wherein the axially-discrete aero-brake feature defines an aero-brake axis extending outward from the base portion, and wherein the axially-discrete aero-brake feature is asymmetric about the aero-brake axis.

3. The turbine blade of claim 1, wherein the axially-discrete aero-brake feature defines a peak extending outward from the base portion, wherein the peak defines an aero-brake axis that is oriented transverse to at least one of the leading edge and the trailing edge of the airfoil portion.

4. The turbine blade of claim 3, wherein the aero-brake axis extends outward from the base portion and upward from the base portion.

5. The turbine blade of claim 1, wherein the axially-discrete aero-brake feature defines a leading face and a trailing face oriented opposite the leading face, wherein at least one of the leading face and the trailing face defines a concave surface.

6. The turbine blade of claim 5, wherein the leading face comprises the concave surface.

7. The turbine blade of claim 1, wherein the axially-discrete aero-brake feature defines one or more peaks defining a serpentine shape extending across the base portion.

8. A turbine engine comprising:
an outer shell;
one or more stators coupled to and extending inward from the outer shell, each of the one or more stators defining a platform extending in an axial direction;
one or more turbine blades comprising:
an airfoil portion extending between a leading edge and a trailing edge;
an outwardly-extending wing positioned inward from the airfoil portion; and
an aero-brake feature positioned between the outwardly-extending wing and the airfoil portion;
wherein:
the one or more turbine blades and the outer shell define a first blade clearance at a first portion of the outer shell and a second blade clearance at a second portion of the outer shell;
the first blade clearance is greater than the second blade clearance; and
the aero-brake feature of the one or more turbine blades is positioned outward of the platform of the one or more stators when the one or more turbine blades is positioned at the second portion of the outer shell.

9. The turbine engine of claim 8, wherein the aero-brake feature of the one or more turbine blades is positioned inward of the platform of the one or more stators when the one or more turbine blades is positioned at the first portion of the outer shell.

10. The turbine engine of claim 8, wherein the aero-brake feature is structurally configured to disrupt airflow across the one or more turbine blades.

11. The turbine engine of claim 8, further comprising a turbine assembly comprising a turbine shaft extending in the axial direction and defining a turbine assembly axis, wherein the one or more turbine blades are coupled to the turbine shaft.

12. The turbine engine of claim 11, wherein the turbine assembly axis is positioned closer to the second portion of the outer shell than the first portion of the outer shell.

13. The turbine engine of claim 8, wherein the aero-brake feature defines an aero-brake axis extending outward from the one or more turbine blades, and wherein the aero-brake feature is asymmetric about the aero-brake axis.

14. The turbine engine of claim 13, wherein the aero-brake axis extends axially and radially outward from the one or more turbine blades.

15. The turbine engine of claim 8, wherein the aero-brake feature defines a leading face and a trailing face oriented opposite the leading face, wherein at least one of the leading face and the trailing face defines a concave surface.

16. The turbine engine of claim 15, wherein the leading face comprises the concave surface.

17. The turbine engine of claim 8, wherein the aero-brake feature defines one or more peaks defining a serpentine shape extending across the one or more turbine blades.

18. A method for operating a turbine engine, the method comprising:
passing a gas over a platform of a stator to a turbine assembly, thereby rotating the turbine assembly, wherein the turbine assembly comprises one or more turbine blades coupled to a turbine shaft, the one or more turbine blades comprising an airfoil portion and an aero-brake feature extending outward from the airfoil portion, wherein the aero-brake feature extends outward from the platform of the stator at a first rotational position and the aero-brake feature is positioned inward from the platform of the stator at a second rotational position that is different from the first rotational position.

19. The method of claim 18, further comprising disrupting a flow of the gas with the aero-brake feature at the first rotational position.

20. The method of claim 19, wherein the one or more turbine blades are positioned closer to an outer shell of the turbine engine at the first rotational position.

* * * * *